US011657351B2

(12) United States Patent
Niisato

(10) Patent No.: US 11,657,351 B2
(45) Date of Patent: May 23, 2023

(54) MANAGEMENT SYSTEM FOR RESPONDING TO INCIDENTS BASED ON PREVIOUS WORKFLOWS

(71) Applicant: NOMURA RESEARCH INSTITUTE, LTD., Tokyo (JP)

(72) Inventor: Takashi Niisato, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 86 days.

(21) Appl. No.: 16/826,367

(22) Filed: Mar. 23, 2020

(65) Prior Publication Data
US 2021/0142237 A1 May 13, 2021

(30) Foreign Application Priority Data
Nov. 12, 2019 (JP) .............................. JP2019-204837

(51) Int. Cl.
G06Q 10/06 (2023.01)
G06Q 10/04 (2023.01)
H04L 41/5074 (2022.01)
G06Q 10/0633 (2023.01)

(52) U.S. Cl.
CPC ......... G06Q 10/0633 (2013.01); G06Q 10/04 (2013.01); H04L 41/5074 (2013.01)

(58) Field of Classification Search
None
See application file for complete search history.

(56) References Cited

U.S. PATENT DOCUMENTS

| 10,439,884 B1* | 10/2019 | Forte ........................ G06F 21/62 |
| 2008/0040181 A1* | 2/2008 | Freire .................. G06Q 10/103 |
| | | 705/7.26 |
| 2009/0063386 A1* | 3/2009 | Hibbets .................. G06Q 10/10 |
| | | 706/50 |

(Continued)

FOREIGN PATENT DOCUMENTS

JP 2017-102870 A 6/2017

OTHER PUBLICATIONS

Zhou, "Resolution Recommendation for Event Tickets in Service Management," 2015, IFIP/IEEE International Symposium on Integrated Network Management, pp. 287-295 (Year: 2015).*

(Continued)

Primary Examiner — Ivan R Goldberg
(74) Attorney, Agent, or Firm — Rankin, Hill & Clark LLP

(57) ABSTRACT

The management system for management support of a computer system, includes a holding means configured to hold information relating to an incident that has occurred previously in the computer system and a procedure for responding to the incident in association with each other, a first acquisition means configured to acquire information relating to an incident newly occurring in the computer system from a user, a second acquisition means configured to acquire, from the holding means, the procedure for responding to the previous incident corresponding to the newly occurring incident on a basis of the information acquired by the first acquisition means, and an update means configured to update the procedure for responding acquired by the second acquisition means on a basis of the acquired information.

13 Claims, 13 Drawing Sheets

(56) References Cited

U.S. PATENT DOCUMENTS

| | | | | |
|---|---|---|---|---|
| 2014/0129536 A1* | 5/2014 | Anand | ............... | G06N 7/005 |
| | | | | 707/706 |
| 2016/0224910 A1* | 8/2016 | Deng | ............... | G06Q 30/016 |
| 2017/0103128 A1* | 4/2017 | Li | ............... | G06Q 10/00 |
| 2018/0307756 A1* | 10/2018 | Garay | ............... | G06N 5/003 |
| 2020/0136928 A1* | 4/2020 | Sethi | ............... | H04L 41/5074 |
| 2020/0159837 A1* | 5/2020 | Tiwari | ............ | G06F 16/24578 |
| 2020/0293946 A1* | 9/2020 | Sachan | ............... | G06N 20/00 |

OTHER PUBLICATIONS

"Senju Family", [online], Nomura Research Institute, Searched on Sep. 12, 2019, Retrieved on Mar. 19, 2020 from the Internet: <https://senjufamily.nri.co.jp/>; Cited in Specification.

* cited by examiner

FIG. 4

| | | INFORMATION OF FLOW | | | | | INFORMATION OF INCIDENT | | | | |
|---|---|---|---|---|---|---|---|---|---|---|---|
| FLOW ID | KEY | FLOW TITLE | NUMBER OF USEFUL TIMES | NUMBER OF TIMES OF USE | CONTENTS OF FLOW | SYSTEM ID | INCIDENT TITLE | TEXT 1 | TEXT 2 | CLASSIFICATION | TIME OF OCCURRENCE |
| FL001 | PD0001 | SOARING CPU USAGE OF ROUTER/SWITCH | 3 | 5 | ... | sys01 | NETWORK ERROR HAS OCCURRED | (VARIABLE) | ... | NW | 2016/2/13 13:30 |
| FL002 | SS0002 | TIGHT STORAGE CAPACITY | 9 | 15 | ... | sys01 | HDD SPACE IS LESS THAN 5% | (VARIABLE) | ... | ME | 2017/3/5 2:42 |

```
                                                                        ,718
┌─────────────────────────────────────────────────────────────────────────┐
│ REGISTER HYN TEST_PROCESS 1                                             │
│  ┌────────┐                                              ┌────────┐     │
│  │ CANCEL │                                              │REGISTER│─730 │
│  └────────┘                                              └────────┘     │
│ ┌─────────────────────────────────────────────────────────────────────┐ │
│ │ BASIC INFORMATION                                                 − │ │
│ │                                                                     │ │
│ │  ID         [                                            ]          │ │
│ │  SYSTEM*    [ HYN_SYSTEM02                             ▼]── 720     │ │
│ │  TITLE*     [ XXX ERROR HAS OCCURRED                    ]── 722     │ │
│ │  TEXT 1     [ server001                                 ]── 724     │ │
│ │  TEXT AREA 1[ ERROR CONTENT:                            ]── 726     │ │
│ │             [ XXXXXXX_Exception_Process_restart         ]           │ │
│ │  COMBO BOX 1[ UNSELECTED                              ▼ ]── 728     │ │
│ │  CLASSIFICATION 1-1 [ UNSELECTED                      ▼ ]           │ │
│ │  DATE AND TIME 1  [📅       ] [🕐 00:00:00              ]           │ │
│ └─────────────────────────────────────────────────────────────────────┘ │
│ ┌─────────────────────────────────────────────────────────────────────┐ │
│ │ WORKFLOW                                                            │ │
│ ├─────────────────────────────────────────────────────────────────────┤ │
│ │ WORKFLOW IS NOT SELECTED                                            │ │
│ └─────────────────────────────────────────────────────────────────────┘ │
│                                                                         │
│  SELECTED USER 1                                                        │
│                     [                              ▲]  [+]              │
│                     [                              ▼]  [−]              │
│                                                                         │
│  ATTACHED FILE 1    ┌- - - - - - - - - - - - - - - - - - - - - - - ┐    │
│                     : CLICK HERE                                   :    │
│                     └- - - - - - - - - - - - - - - - - - - - - - - ┘    │
│                     ┌──────────────────────────────────────────────┐    │
│                     │                                            ▲ │    │
│                     │                                              │    │
│                     │                                              │    │
│                     │                                            ▼ │    │
│                     └──────────────────────────────────────────────┘    │
│  ISSUANCE DATE AND TIME [                                          ]    │
│  UPDATE DATE AND TIME   [                                          ]    │
└─────────────────────────────────────────────────────────────────────────┘
```

FIG. 10

| | | | | | 732 |
|---|---|---|---|---|---|

XXX ERROR HAS OCCURRED-FOR HYN TEST_PROCESS 1 DETAILS

·IT HAS BEEN UPDATED

[ CLOSE ] [ DELETE ] [ EDIT ]

BASIC INFORMATION −

| ID | 20190815-0000849 |
|---|---|
| SYSTEM* | HYN_SYSTEM01 ▼ |
| TITLE* | XXX ERROR HAS OCCURRED |
| TEXT 1 | server001 |
| TEXT AREA 1 | ERROR CONTENT:<br>XXXXXXX_Exception_Process_restart |
| COMBO BOX 1 | ▼ |
| CLASSIFICATION 1-1 | ▼ |
| DATE AND TIME 1 | |

734

RECOMMENDATION LIST

| No | SCORE | KEY | TITLE | NUMBER OF USEFUL TIMES | USAGE |
|---|---|---|---|---|---|
| 1 | 1.6 | L1_20190731-0000083 | WORKFLOW_test | 3 | 6 |
| 2 | 0.9 | L1_20190806-0000091 | Senju/SM CREATE TRIAL ENVIRONMENT | 0 | 9 |

736

WORKFLOW [ SELECT WORKFLOW ]

WORKFLOW IS NOT SELECTED

| SELECTED USER 1 | | [+] [−] |
|---|---|---|

| ATTACHED FILE 1 | |
|---|---|

FIG. 13

CONTENT OF RESPONSE

EXECUTE COMMAND

COMMAND    ping [-c 4[param01]][[param02]]
           NUMBER OF PARAMETERS: 2

COMMAND PARAMETER INFORMATION

PARAMETER 01  192.168.65.187
PARAMETER 02  2

OK    NG

EXECUTION INFORMATION

START DATE AND TIME  2017/11/06   TEMPORARY STORAGE  19:02
END DATE AND TIME
PERSON CONDUCTED
INTERRUPTION TIME  (MIN)
CONTENT CONDUCTED
ATTACHED FILE    + −
CONTACT    +

FIG. 14

CONTENT OF RESPONSE

APPLICATION APPROVAL

MANAGER APPROVAL

CHECK APPLICATION CONTENT AND CLICK APPROVAL BUTTON

EXECUTION INFORMATION | TEMPORARY STORAGE | 18:32

START DATE AND TIME 2017/11/09
END DATE AND TIME
PERSON CONDUCTED
INTERRUPTION TIME (MIN)

CONTENT CONDUCTED

ATTACHED FILE [+] [−]

CONTACT [+]

[APPROVAL] [REJECTION] [REMAND] [REMAND 2]

MANAGEMENT SYSTEM FOR RESPONDING TO INCIDENTS BASED ON PREVIOUS WORKFLOWS

TECHNICAL FIELD

The present invention relates to a management system that supports the management of a computer system.

BACKGROUND ART

The scale of computer systems that makes IT available in the business of firms, government offices, and public organizations gets bigger with the increase in the number of users, the works to do, and the degree of IT introduction. Hundreds of or thousands of computer systems are not uncommon nowadays. It is not practical to manage such a computer system only by hand, so an operation management system of a computer system is developed, in one example, as disclosed in Patent Literature 1 or Non Patent Literature 1.

In an operation management system for a computer system, it is important to improve the efficiency of management. In one example, the operation management system disclosed in Non Patent Literature 1 makes the operation know-how available as knowledge and recommends an operation process with AI to improve management efficiency.

CITATION LIST

Patent Literature

Patent Literature 1: JP 2017-102870 A

Non Patent Literature

Non Patent Literature 1: "Senju Family", https://senjufamily.nri.co.jp/, searched on Sep. 12, 2020

SUMMARY OF INVENTION

Technical Problem

However, the operation management system disclosed in Non Patent Literature 1 still has room for improvement in the efficiency.

The present invention has been made in view of such a problem, and an object of the present invention is to provide a technology capable of making operation management of a computer system more efficient.

Solution to Problem

An aspect of the present invention relates to a management system. The management system for management support of a computer system includes a holding means configured to hold information relating to an incident that has occurred previously in the computer system and a procedure for responding to the incident in association with each other, a first acquisition means configured to acquire information relating to an incident newly occurring in the computer system from a user, a second acquisition means configured to acquire, from the holding means, the procedure for responding to the previous incident corresponding to the newly occurring incident on a basis of the information acquired by the first acquisition means, and an update means configured to update the procedure for responding acquired by the second acquisition means on a basis of the acquired information.

Moreover, an aspect of the present invention also includes any combination of the above-described components as well as those in which the components and expressions of the present invention are replaced among an apparatus, a process, a system, a computer program, a recording medium having a computer program stored, and the like.

Advantageous Effects of Invention

According to the present invention, it is possible to make operation management of a computer system more efficient.

BRIEF DESCRIPTION OF DRAWINGS

FIG. 4 is a data structure diagram illustrating an example of a knowledge workflow holding unit of FIG. 3.

FIG. 9 is a representative screen diagram of a ticket issuance screen displayed on a display of a terminal at a service desk.

FIG. 10 is a representative screen diagram of a recommendation screen displayed on the display of the terminal at the service desk.

FIG. 13 is a representative screen diagram of a task contents display screen displayed on the display of the terminal at the service desk.

FIG. 14 is a representative screen diagram of another task contents display screen displayed on the display of the terminal at the service desk.

DESCRIPTION OF EMBODIMENT

Figure 1:
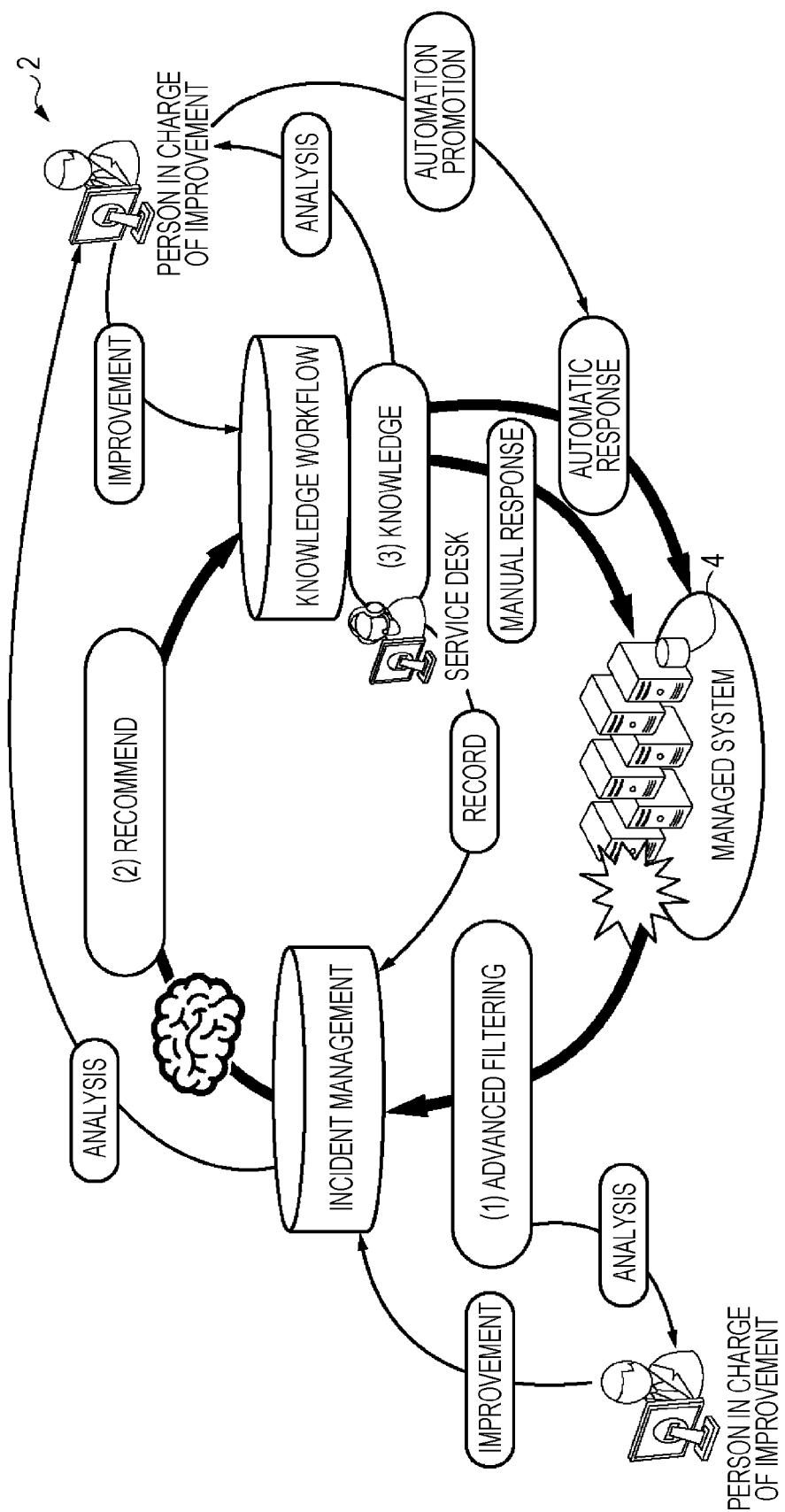
FIG. 1 is a schematic diagram of a management system and a managed system according to an embodiment.

Hereinafter, the same or equivalent components, members, and processing shown in the drawings will be denoted by the same reference numerals, and repeated description will be omitted as appropriate. In addition, some of the members that are unimportant for the description are omitted in the drawings.

FIG. 1 is a schematic diagram of a management system 2 and a managed system 4 according to an embodiment. The management system 2 supports operation management of the managed system 4. The managed system 4 is a computer system used to provide IT services for various businesses such as securities and distribution, and includes, in one example, a plurality of computers, a plurality of servers, a plurality of databases, a plurality of network equipment, and the like.

At the work site where the managed system 4 is operated, various information including a request from a user, a response history of an operation staff, a request status to an outside vendor, and the like are collected in addition to a message and operation history from the managed system 4. The management system 2 makes such information available as knowledge and achieves autonomous operation utilizing AI. In addition, the management system 2 achieves an efficiency of business and improvement in operational quality at a service desk or through advanced message filtering, dashboard, recommendation, and the like.

The management system 2 collects information from the managed system 4 or a user, analyzes the degree of matching of characteristic words and a correlation in an event before and after using machine learning, to making a recommendation for troubleshooting and making the operation know-how available as knowledge. In one example, the management system 2 has the following functions.

Proactive response to unknown failure by matching with a previous similar response history in the past.

Forecasting a future change by continuous analysis of an event from the managed system 4.

More active support for IT service management through incident trend analysis.

Continuous operation improvement by providing feedback on the effectiveness of recommendation and knowledge.

The present embodiment describes, in particular, knowledge of a procedure (hereinafter, referred to as a workflow) for responding to an incident for failure or an improvement request, or the like that occurs in the managed system 4 and a function upon applying a knowledge-based workflow (hereinafter, referred to as a knowledge workflow) to a newly occurring incident. Other functions of the management system 2 can be implemented, in one example, as functions similar to the functions of the system disclosed in Patent Literature 1 and Non Patent Literature 1.

Figure 2:
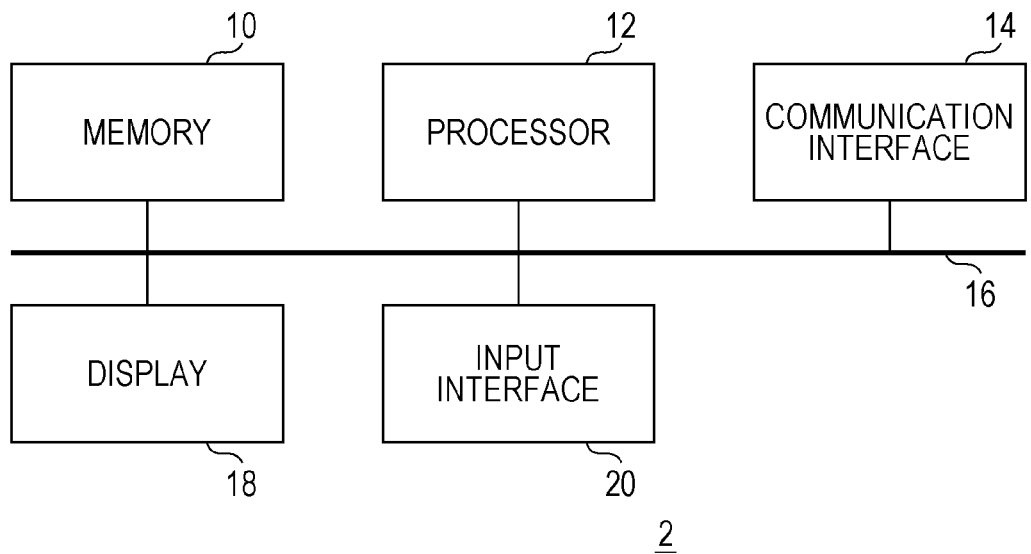
FIG. 2 is a hardware configuration diagram of the management system of FIG. 1.

FIG. 2 is a hardware configuration diagram of the management system 2 of FIG. 1. The management system 2 includes a memory 10, a processor 12, a communication interface 14, a display 18, and an input interface 20. These components are each connected to a bus 16 and communicate with each other via the bus 16. Moreover, the management system 2 can be implemented as one server or can include a plurality of servers having the configuration shown in FIG. 2.

The memory 10 is a storage area for storing data or a program. The data or program can be permanently stored in the memory 10 or can be temporarily stored. The processor 12 executes a program stored in the memory 10 to implement various functions of the management system 2. The communication interface 14 is an interface for transmitting and receiving data between the management system 2 and the outside. The communication interface 14 is connected to a network such as the Internet, for exchanging data with the managed system 4, the terminal of a service desk, or the terminal of a person in charge of improvement via the network. The display 18 is a device for displaying various types of information. The input interface 20 is a device for receiving input from a user.

Figure 3:
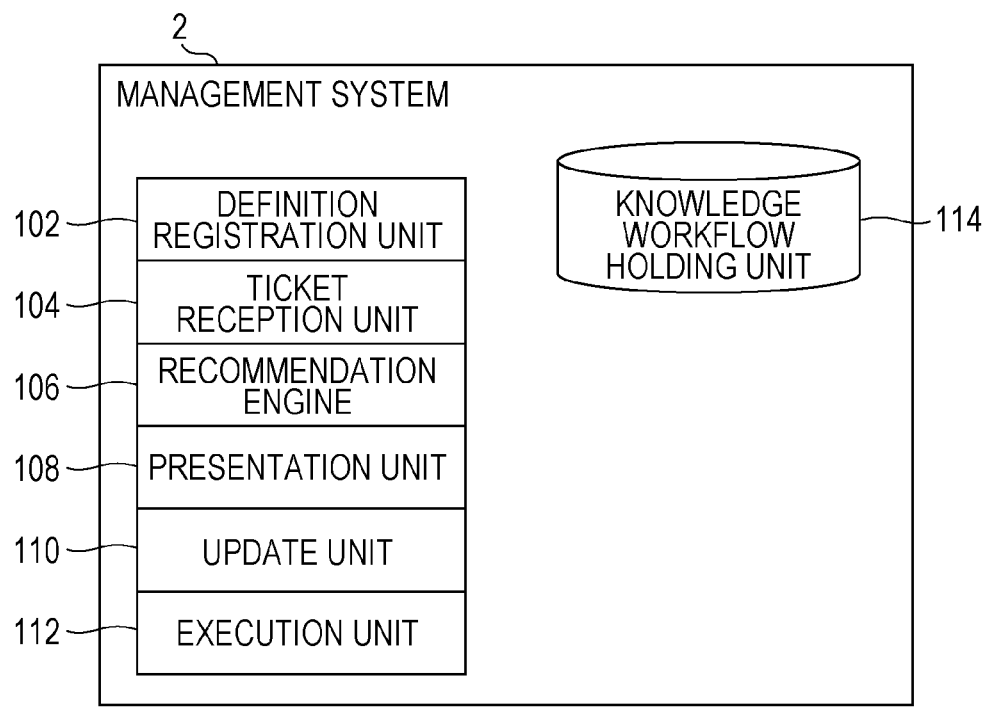
FIG. 3 is a block diagram illustrating a function and configuration of the management system of FIG. 1.

FIG. 3 is a block diagram illustrating a function and configuration of the management system 2 of FIG. 1. The respective blocks shown in this figure can be implemented by hardware such as a computer CPU and other devices or the machinery or can be implemented by software such as a computer program, but in this description, the illustrated functional blocks are implemented by their cooperation. Thus, it will be understood by those skilled in the art having reference to this specification that these functional blocks can be implemented in various forms by a combination of hardware and software.

The management system 2 includes a definition registration unit 102, a ticket reception unit 104, a recommendation engine 106, a presentation unit 108, an update unit 110, an execution unit 112, and a knowledge workflow holding unit 114. The management system 2 converts the workflow when an incident has occurred in the managed system 4 in the past into knowledge and accumulates the knowledge as a knowledge workflow. In the management system 2, the recommended knowledge workflow navigates the optimal response procedure. The display in a flow procedure manner in such a way to be easy to understand even for a complicated procedure makes it possible to give an execution instruction such as an investigation command from a screen.

The definition registration unit 102 makes a workflow for an incident that has occurred in the managed system 4 in the past available as knowledge. The definition registration unit 102 presents contents of the previous incident and the workflow executed for the incident to a person in charge of improvement. The person in charge of improvement corrects and modifies the presented workflow as appropriate. In particular, the person in charge of improvement performs the abstraction of the workflow. In one example, the person in charge of improvement describes, in the form of a variable, a part that specifies a target to be operated in the workflow. The definition registration unit 102 acquires the workflow corrected or modified by the person in charge of improvement as a knowledge workflow and registers the acquired knowledge workflow in the knowledge workflow holding unit 114 in association with the corresponding previous incident.

FIG. 4 is a data structure diagram illustrating an example of a knowledge workflow holding unit 114 of FIG. 3. The knowledge workflow holding unit 114 holds information relating to an incident that has occurred in the managed system 4 in the past and a knowledge workflow generated on the basis of a workflow for the relevant incident in association with each other. The knowledge workflow holding unit 114 holds a flow ID used to specify the knowledge workflow, information regarding the knowledge workflow, and information regarding the previous incident corresponding to the knowledge workflow in association with each other.

The information regarding the knowledge workflow includes key information regarding the knowledge workflow, a title of the knowledge workflow, the number of useful times, the number of times of use, and contents of the knowledge workflow. The title of the knowledge workflow includes text that briefly describes the flow, and can be, in one example, a summary of the corresponding incident. The number of useful times is the number of times received feedback that the knowledge workflow has been useful when the knowledge workflow is selected by the recommendation engine 106 described later and used at the service desk. The number of times of use is the number of times that the knowledge workflow is selected by the recommendation engine 106 described later and used at the service desk. In the contents of the knowledge workflow, a part used to specify a target to be operated is described as a variable.

The information regarding the previous incident includes a system ID used to specify the managed system 4 in which the incident has occurred, a title of the incident, text 1 and text 2 each of which is a text input area, classification of the incident, and the time of occurrence of the incident. The title of the incident includes text that briefly describes the relevant incident, and in one example, in a case where the incident is an erroneous one, the title can be an error message. Text 1 is an area where the user can freely enter text regarding the incident. In a case where a variable is set in the corresponding knowledge workflow, a value to be substituted into the variable upon selection of the knowledge workflow by the user is input to text 1. The classification indicates the incident classification. In one example, "NW" is registered as a classification for a network-related failure and "ME" is registered as a classification for a memory-related failure.

Referring back to FIG. 3, the ticket reception unit 104 acquires information relating to an incident newly occurring in the managed system 4 from the service desk. In a case where a new incident such as a system failure occurs in the managed system 4, the service desk generates or issues a ticket in which the contents of an error message and the classification of the failure are input. The ticket reception unit 104 receives the generated ticket.

The recommendation engine 106 acquires the knowledge workflow corresponding to the newly occurring incident from the knowledge workflow holding unit 114 on the basis of the contents of the ticket received by the ticket reception unit 104. The recommendation engine 106, when selecting a knowledge workflow from the knowledge workflow holding unit 114, uses a model obtained by machine learning. The machine learning and the model itself can be implemented using a known machine learning technique.

The recommendation engine 106 inputs, in one example, the contents of the error message described in the ticket and the failure classification to the model. The model calculates the degree of coincidence between the information regarding the incident registered in the knowledge workflow holding unit 114 and the contents of the input error message and the failure classification, that is, the degree of similarity between the previous incident and the newly occurring incident. The recommendation engine 106 registers the degree of coincidence calculated for the incident registered in the knowledge workflow holding unit 114 as a score of the knowledge workflow corresponding to the relevant incident. The recommendation engine 106 outputs a predetermined number of knowledge workflows in order of the highest score as recommended knowledge workflows.

The presentation unit 108 presents the recommended knowledge workflow output by the recommendation engine 106 to the service desk in a selectable manner. The presentation unit 108 generates a screen including information regarding the recommended knowledge workflow and causes the generated screen to be displayed on the display of a terminal at the service desk.

The update unit 110 updates the recommended knowledge workflow output by the recommendation engine 106 on the basis of the contents of the ticket received by the ticket reception unit 104. The contents of update in the update unit 110 correspond to the difference between the newly occurring incident and the previous incident corresponding to the recommended knowledge workflow selected for the newly occurring incident. In one example, the update unit 110 replaces a variable of the recommended knowledge workflow with a specific value included in the ticket received by the ticket reception unit 104. Details of the update will be described later.

The execution unit 112, in a case where one of the recommended knowledge workflows presented to the service desk by the presentation unit 108 is selected by the service desk, outputs the selected recommended knowledge workflow to the update unit 110. The execution unit 112 acquires the recommended knowledge workflow updated by the update unit 110 and executes the acquired recommended knowledge workflow.

Figure 5:
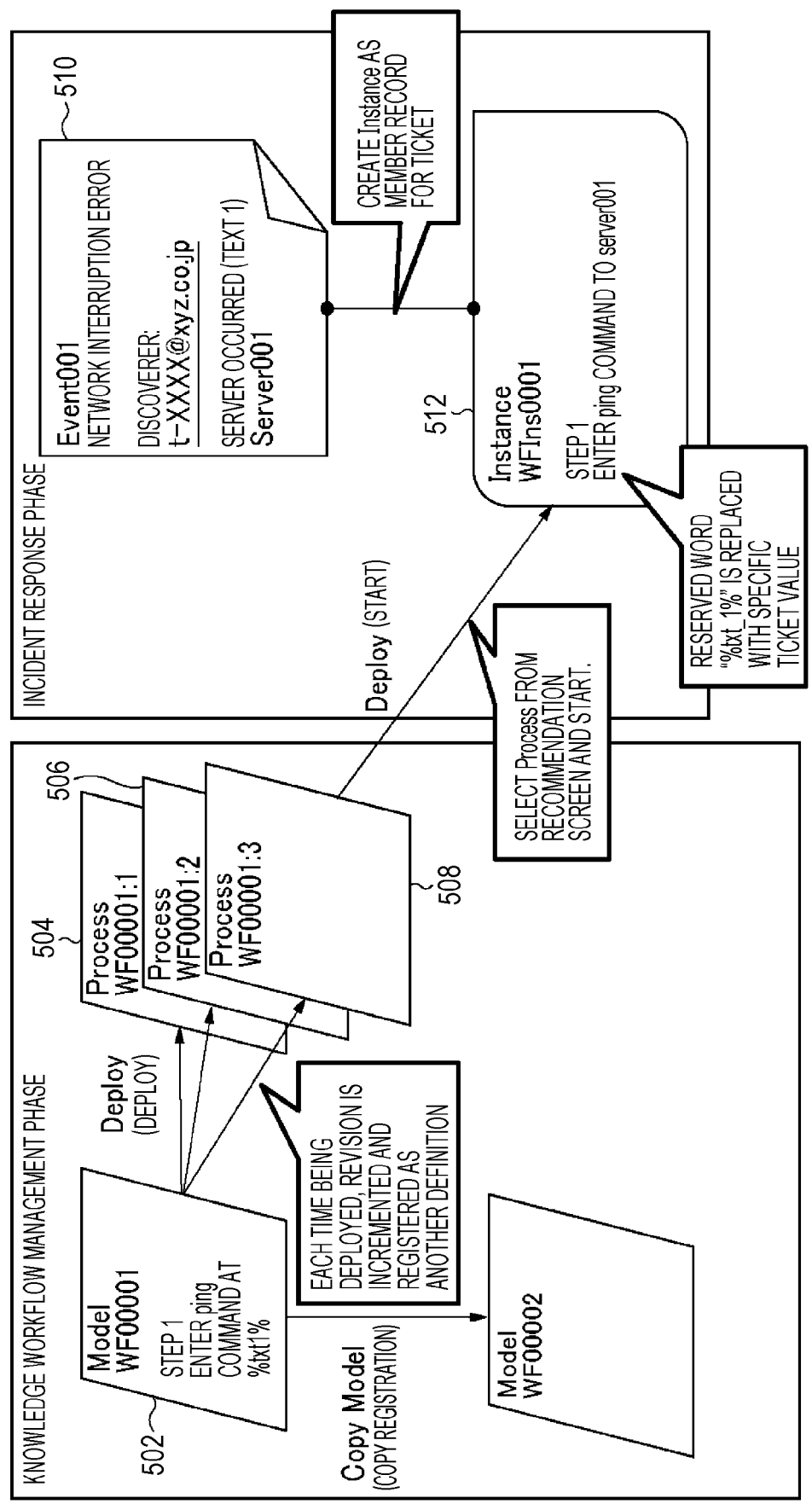
FIG. 5 is a schematic diagram illustrating an example of processing in the management system of FIG. 1.

FIG. 5 is a schematic diagram illustrating an example of processing in the management system 2 of FIG. 1. In the knowledge workflow management phase, the definition registration unit 102 registers a knowledge workflow model 502 in the knowledge workflow holding unit 114. In the model 502, "step 1: enter ping command at % txt1%" is described as the contents of the knowledge workflow. In the knowledge workflow, the part used to specify a target to which the ping command is to be entered is described by a reserved word "% txt1%".

The model 502 can be duplicated by a copy registration operation. Each time the model 502 is deployed, the revision is incremented and registered as another definition (process). FIG. 5 illustrates three processes 504, 506, and 508.

In the incident response phase, the ticket reception unit 104 receives a ticket 510. In the ticket 510, "network interruption error" is described as the contents of the incident, "t-xxxx@xyz.co.jp" is described as the discoverer, and "Server001" is described as a server where the error has occurred. "Server001" is described in a text 1 input area that is described later of the ticket 510. The text 1 input area corresponds to the reserved word "% txt1%".

The recommendation engine 106 selects the process 508 as the recommended knowledge workflow for the contents of the ticket 510, and the presentation unit 108 presents the process 508 to the service desk on a recommendation screen described later. In a case where the service desk selects the process 508 from the recommendation screen and inputs a start instruction, the update unit 110 creates an instance 512 as a member record for the ticket 510. The update unit 110, when creating the instance 512 from the process 508, replaces the reserved word "% txt1%" with the value "Server001" input to the text 1 input area of the ticket 510. As a result, the contents of the instance 512 includes "step 1: enter ping command to Server001", which is in an executable form.

In the previous incident that is the basis of the model 502, although a part of the reserved word "% txt1%" is a specific server name (e.g., "Server022"), the specific server name is replaced with the reserved word "% txt1%" by the abstraction in the definition registration unit 102. Then, in the instance 512 executed for the newly occurring incident, the reserved word "% txt1%" is replaced with "Server001" corresponding to the newly occurring incident. In this way, in the example illustrated in FIG. 5, in a case where the workflow for the previous incident is abstracted into the knowledge workflow, a part describing the operation is maintained as it is (remains in its specific state), and the abstraction is performed by converting the part that specifies the target to be operated into a variable such as a reserved word. This makes it possible, when a new incident similar to the previous incident occurs, to easily generate an effective workflow for a newly occurring incident by inputting the target to be operated target into the ticket.

The operation of the management system 2 having the above-mentioned configuration is described.

Figure 6:
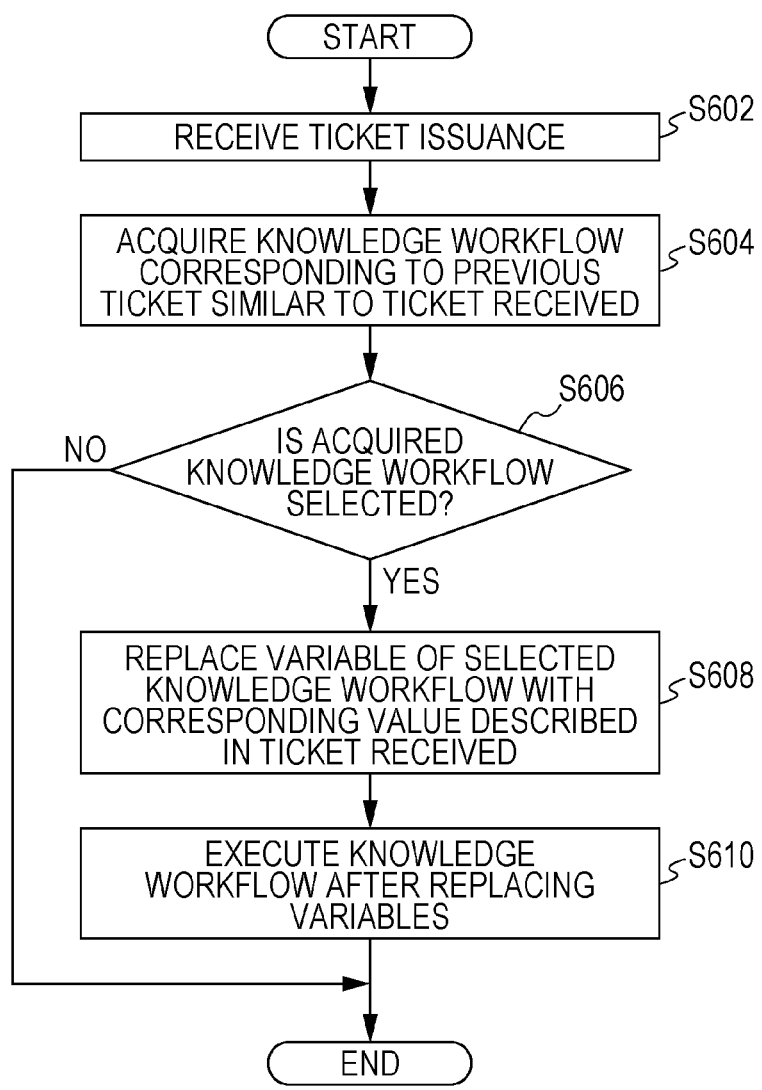
FIG. 6 is a flowchart showing a procedure of a series of processing steps in the management system of FIG. 1.

FIG. 6 is a flowchart showing a procedure of a series of processing steps in the management system 2 of FIG. 1. The management system 2 receives a ticket issuance (S602). The management system 2 acquires a knowledge workflow corresponding to a previous ticket (incident) similar to the ticket received in step S602 (S604). The management system 2 presents the knowledge workflow acquired in step S604 to the service desk. If the acquired knowledge workflow is not selected by the service desk (No in S606), in one example, in a case where the service desk creates a new workflow, the processing relating to workflow reuse ends. If the acquired knowledge workflow is selected by the service desk (Yes in S606), the management system 2 replaces the variable of the selected knowledge workflow with a corresponding value described in the ticket received in step S602 (S608). The management system 2 executes the knowledge workflow after replacing the variables (S610).

Figure 7:
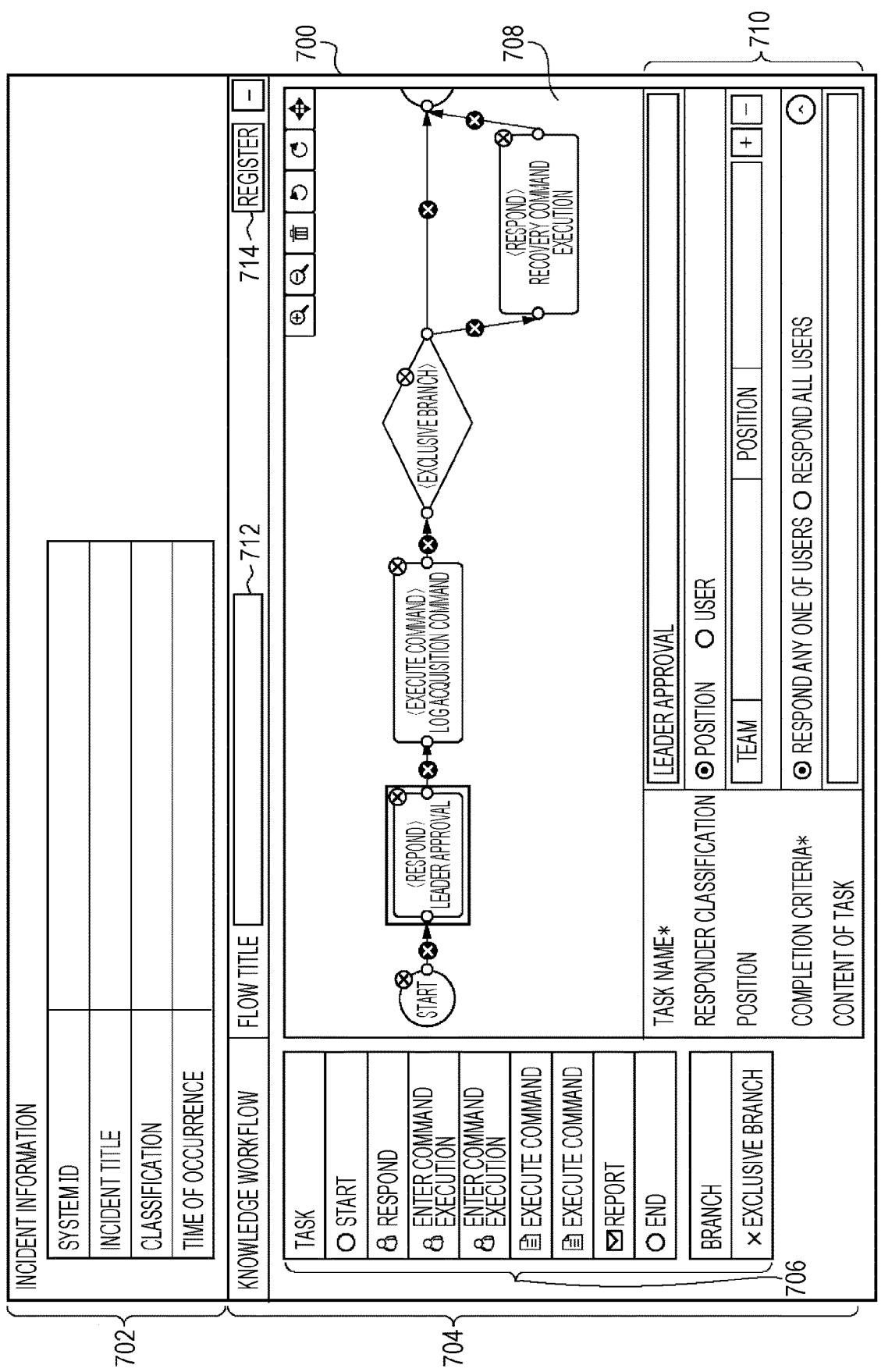
FIG. 7 is a representative screen diagram of a workflow definition registration screen displayed on a display of a terminal of a person in charge of improvement.

FIG. 7 is a representative screen diagram of a workflow definition registration screen 700 displayed on a display of a terminal of a person in charge of improvement. The definition registration unit 102, when receiving a request to generate a new knowledge workflow from the person in charge of improvement, generates the workflow definition registration screen 700. The workflow definition registration screen 700 can be provided in a blank state or, in a case where the person in charge of improvement specifies the previous workflow/previous incident that is the basis, can be provided in a form where the relevant workflow/incident is imported.

The workflow definition registration screen 700 has a flow title input area 712, an incident information input area 702, a knowledge workflow information input area 704, and a register button 714. The incident information input area 702 has an area for inputting various types of information regarding the previous incident. The knowledge workflow information input area 704 has a component area 706, a workflow generation area 708, and a task-information specifying area 710. The person in charge of improvement arranges a component to be used from a plurality of components displayed in the component area 706 at a desired position in the workflow generation area 708 by drag and drop. The workflow generation area 708 is configured so that contextual editing or branch setting can be performed graphically. The task-information specifying area 710 is an area for specifying a parameter of the task specified in the workflow generation area 708. The task-information specifying area 710 is configured to be easily settable such a parameter by presenting a parameter such as a responder and a completion condition in an option format.

The definition registration unit 102, in a case where the input on the workflow definition registration screen 700 is completed and the register button 714 is depressed, acquires the incident information input in the incident information input area 702 and the knowledge workflow information input in the knowledge workflow information input area 704 and registers them in the knowledge workflow holding unit 114.

In this way, the use of the workflow definition registration screen 700 allows the registration of the knowledge workflow to be completed in the management system 2. In addition, by allowing an appropriate one of the parameters to be set by a selection operation from a master database, it is possible to eliminate the need for text input. This makes it possible to reduce the time necessary for creating a knowledge workflow.

Figure 8:
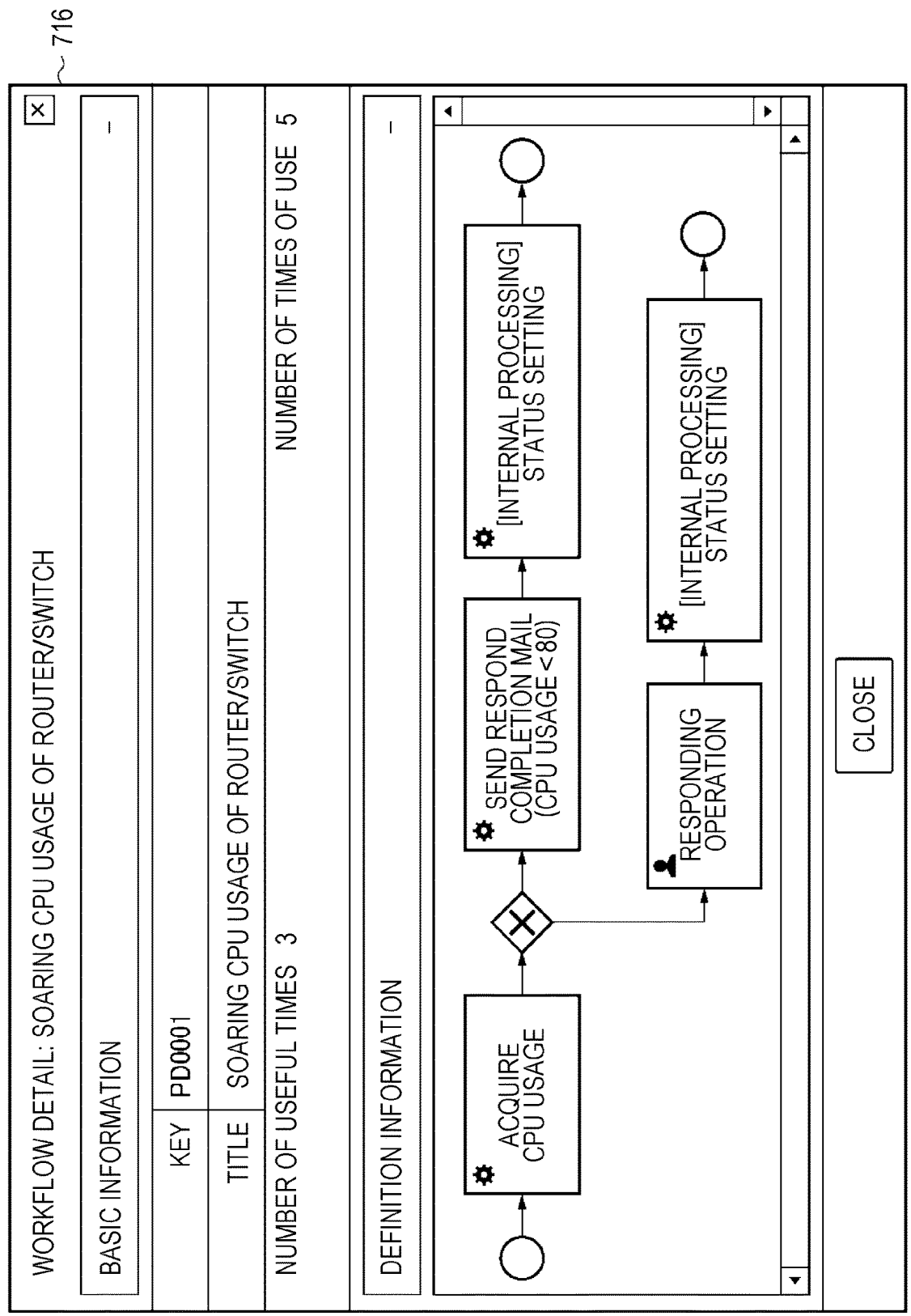
FIG. 8 is a representative screen diagram of a knowledge workflow detail screen displayed on a display of a terminal of a person in charge of improvement.

FIG. 8 is a representative screen diagram of a knowledge workflow detail screen 716 displayed on a display of a terminal of a person in charge of improvement. The definition registration unit 102, when receiving a detail check request of a registered knowledge workflow from the person in charge of improvement, generates the knowledge workflow detail screen 716. On the knowledge workflow detail screen 716, information regarding a specified one piece of information in the knowledge workflows registered in the knowledge workflow holding unit 114 is displayed.

FIG. 9 is a representative screen diagram of a ticket issuance screen 718 displayed on a display of a terminal at a service desk. The ticket reception unit 104, when receiving a ticket issuance request from the service desk, generates a ticket issuance screen 718. The ticket issuance screen 718 includes, for a newly occurring incident, a system input area 720 for receiving an input of a name or a system ID of a system in which the relevant incident occurs, a title input area 722 for receiving an input of a title of the relevant incident, a text 1 input area 724 for receiving a text input, a text area 1 input area 726 for receiving a text input, and a classification input area 728 for receiving an input of the classification of the relevant incident. The service desk inputs the information regarding the newly occurring incident on the ticket issuance screen 718 and depresses the register button 730. Then, the ticket reception unit 104 receives the information input to the ticket issuance screen 718 as information regarding a newly occurring incident.

FIG. 10 is a representative screen diagram of a recommendation screen 732 displayed on the display of the terminal at the service desk. In a case where the register button 730 on the ticket issuance screen 718 is depressed, the transition of display of the screen from the ticket issuance screen 718 to the recommendation screen 732 is performed. The recommendation screen 732 has a ticket information display area 734 for displaying information regarding the ticket received on the ticket issuance screen 718, and a recommendation information display area 736. In the recommendation information display area 736, information regarding the recommended knowledge workflow acquired by the recommendation engine 106 depending on the information regarding the ticket received on the ticket issuance screen 718 is displayed together with the score. The recommendation information display area 736 displays information regarding the recommended knowledge workflow in the order of scores in a table format.

Figure 11:
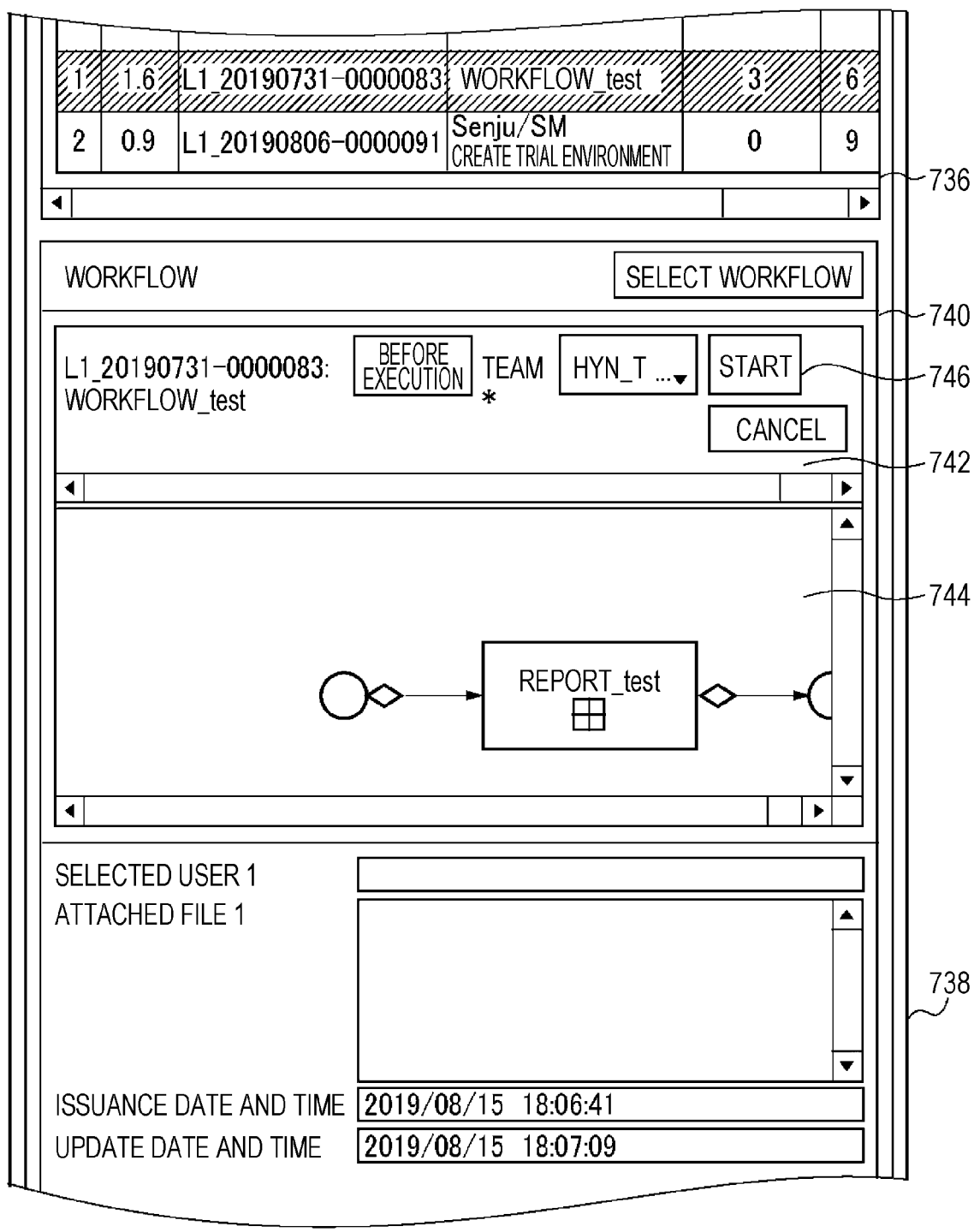
FIG. 11 is a representative screen diagram of a workflow specifying screen displayed on the display of the terminal at the service desk.

FIG. 11 is a representative screen diagram of a workflow specifying screen 738 displayed on the display of the terminal at the service desk. In a case where one recommended knowledge workflow is selected in the recommendation information display area 736 of the recommendation screen 732, the transition of display of the screen on the display from the recommendation screen 732 to the workflow specifying screen 738 is performed. The workflow specifying screen 738 has a recommendation information display area 736 and a workflow information display area 740 that displays information regarding the recommended knowledge workflow selected in the recommendation information display area 736. The entry corresponding to the recommended knowledge workflow selected in the recommendation information display area 736 is highlighted with diagonal lines, coloring, or the like.

The workflow information display area 740 has a title and other information display area 742 for displaying the title of the selected recommended knowledge workflow and other information, and a flow contents display area 744 for displaying the contents of the selected recommended knowledge workflow. In a case where the service desk checks the contents of the workflow displayed in the flow contents display area 744 and depresses a start button 746, the update unit 110 updates the selected recommended knowledge workflow, and the execution unit 112 executes the updated recommended knowledge workflow.

Figure 12:
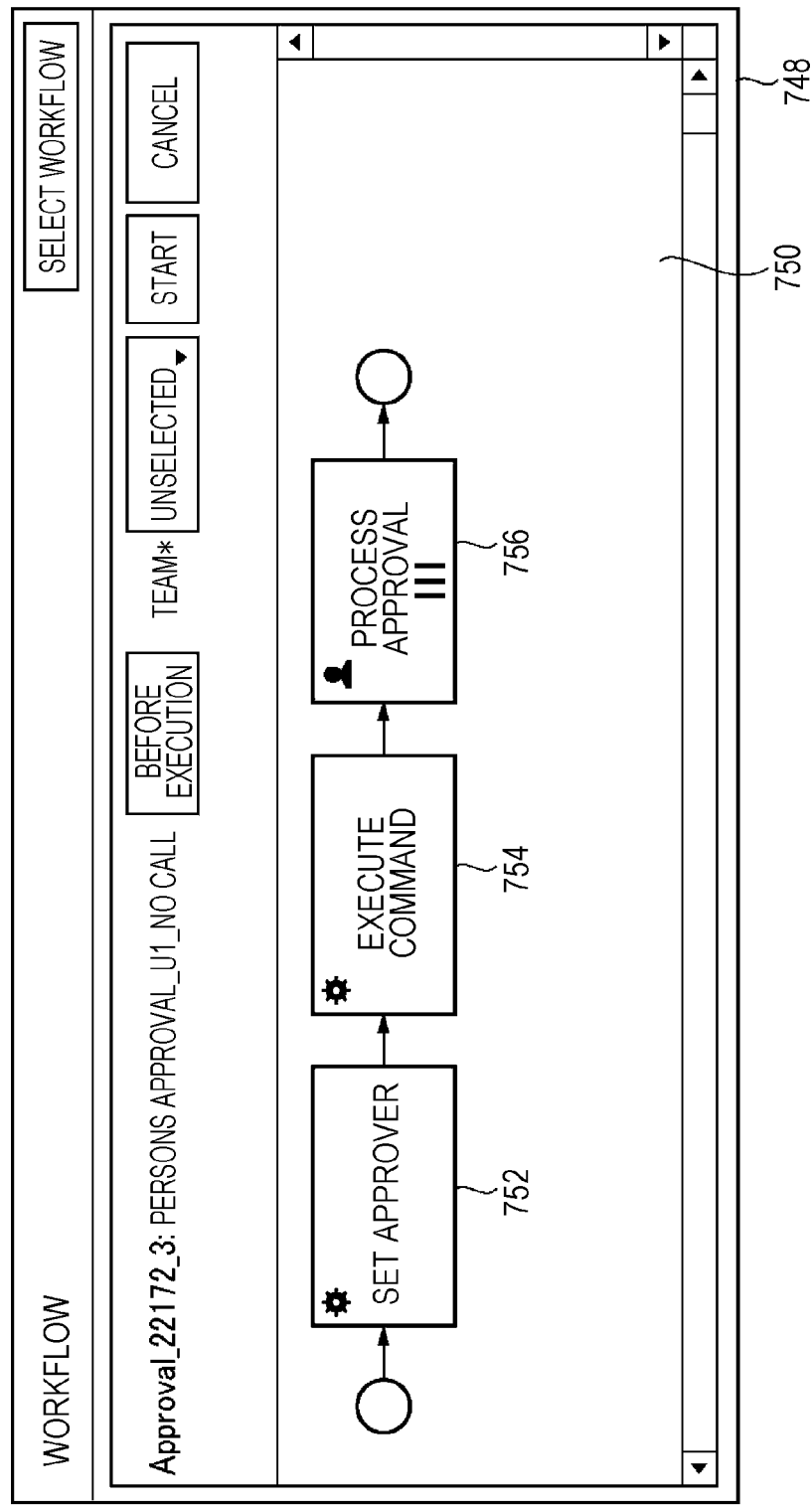
FIG. 12 is a representative screen diagram of another workflow information display area displayed on the display of the terminal at the service desk.

FIG. 12 is a representative screen diagram of another workflow information display area 748 displayed on the display of the terminal at the service desk. The recommended knowledge workflow displayed in a flow contents display area 750 of the workflow information display area 748 is constituted by three tasks 752, 754, and 756.

FIG. 13 is a representative screen diagram of a task contents display screen 758 displayed on the display of the terminal at the service desk. In a case where the command execution task 754 is selected in the flow contents display area 750 of FIG. 12, the task contents display screen 758 of FIG. 13 is displayed. The task contents display screen 758 has a command contents display area 760 for displaying the contents of the command, a command parameter information display area 762 for displaying command parameter information, an execution information display area 764 for displaying command execution information. The information displayed in the command parameter information display area 762 and the execution information display area 764 can be optionally modified or updated by input at the service desk.

FIG. 14 is a representative screen diagram of another task contents display screen 766 displayed on the display of the terminal at the service desk. In a case where an approval task 756 is selected in the flow contents display area 750 of FIG. 12, the task contents display screen 766 of FIG. 14 is displayed.

In the above embodiment, examples of the holding unit are a hard disk and a semiconductor memory. In addition, it will be appreciated by those skilled in the art referred to herein, on the basis of the description in this specification, each unit is implemented by a CPU (not shown), a module of an installed application program, a module of a system program, and a semiconductor memory for temporarily storing the contents of data read from a hard disk.

According to the management system 2 according to the present embodiment, in a case where a workflow for a previous incident is made into knowledge, the appropriate abstraction makes it possible to save the labor of rewriting upon reusing the previous workflow for the newly occurring incident. This makes it possible to provide the operation management system capable of utilizing the knowledge more efficiently.

Further, as shown in the examples of FIGS. 11 to 14, in the present embodiment, by displaying the workflow graphically, it is possible to follow the troubleshooting while viewing the screen even in a complicated procedure. In addition, the execution of an investigation command or the like can be instructed from the screen. In addition, the setting of an appropriate rule makes it also possible to automatically execute a diagnosis and recovery command.

The configuration and operation of the management system 2 according to an embodiment are described above. The present embodiment is an exemplification, and it is understood by those skilled in the art that various modifications can be made to the combination of each component and each processing, and such modifications are also within the scope of the present invention.

REFERENCE SIGNS LIST

2 Management system
4 Managed system
102 Definition registration unit
104 Ticket reception unit
106 Recommendation engine
108 Presentation unit
110 Update unit
112 Execution unit
114 Knowledge workflow holding unit

The invention claimed is:

1. A management system for management support of a computer system including a plurality of computers, a plurality of servers, a plurality of databases and a plurality of network equipment, comprising:
a memory; and
a processor executing a program stored in the memory, the program causing the management system to implement:
a knowledge workflow holding unit configured to hold information relating to an incident that has occurred previously in the computer system and a knowledge workflow generated from a previous workflow for responding to the incident in association with each other, the previous workflow including a command execution task and an approval task;
a ticket reception unit configured to acquire information relating to an incident newly occurring in the computer system from a user;
a definition registration unit configured to acquire, from the knowledge workflow holding unit, the knowledge workflow generated from the previous workflow for responding to the previous incident corresponding to the newly occurring incident on a basis of the information acquired by the ticket reception unit; and
an update unit configured to update the knowledge workflow acquired by the definition registration unit on a basis of the information acquired by the ticket reception unit,
wherein contents updated by the update unit in the knowledge workflow depends on a difference between the newly occurring incident and the previous incident corresponding to the newly occurring incident,
the previous workflow has a part describing an operation and a target word corresponding to one of the plurality of computers, the plurality of servers, the plurality of databases or the plurality of network equipment,
the knowledge workflow is generated from the previous workflow by replacing, by the definition registration unit, the target word with a variable to be operated while the part describing the operation remains unchanged,
the information relating to the newly occurring incident acquired by the ticket reception unit includes a specific value specifying one of the plurality of computers, the plurality of servers, the plurality of databases or the plurality of network equipment where the newly occurring incident has occurred,
the update unit replaces the targeted variable in the knowledge workflow with the specific value from the newly occurring incident specifying the one of the plurality of computers, the plurality of servers, the plurality of databases or the plurality of network equipment where the newly occurring incident has occurred,
the management system further comprises a presentation unit configured to present the knowledge workflow acquired by the definition registration unit to the user in a selectable manner;
the management system further comprises an execution unit configured to execute the knowledge workflow updated by the update unit upon selection of the knowledge workflow acquired by the definition registration unit by the user, the definition registration unit increments the selected knowledge workflow and increments the version in the knowledge workflow holding unit, the presentation unit presents a workflow generation area that receives selections at desired positions by drag and drop from users to edit the workflow and place the command execution task and the approval task and edit branch settings, the definition registration unit comprises a screen that has a flow title input area, an incident information input area, a knowledge workflow information input area, and a register button, the incident information input area has an area for inputting various types of information regarding the previous incident, and the knowledge workflow information input area has a component area, a workflow generation area, and a task-information specifying area, wherein a component to be used is arranged by the user from a plurality of components displayed in the component area at a desired position in the workflow generation area by drag and drop, and the workflow generation area is configured to specify a parameter of the task specified in the workflow generation area.

2. The management system according to claim 1, wherein the definition registration unit acquires the knowledge workflow using a model obtained by machine learning.

3. The management system according to claim 1, wherein
the information acquired by the ticket reception unit includes contents of error message and failure classification, and
the second acquisition unit calculates the degree of similarity, as a score for the respective knowledge workflow, between the knowledge workflow held in the knowledge workflow holding unit and the contents of the error message and the failure classification, and outputs a predetermined number of the knowledge workflow in order of the highest score as recommended workflow.

4. The management system according to claim 3, wherein the presentation unit presents the predetermined number of the knowledge workflow in order of the highest score, along with the calculated score.

5. The management system according to claim 3, wherein
the presentation unit presents the predetermined number of the knowledge workflow in order of the highest score, along with number of times of use of the knowledge workflow.

6. The management system according to claim 3, wherein
the presentation unit presents the predetermined number of the knowledge workflow in order of the highest score, along with the calculated score,
in a case where one knowledge workflow is selected by the user, the presentation unit presents a workflow specifying screen including a recommendation information display area and a workflow information display area that displays information regarding the selected knowledge workflow, wherein an entry corresponding to the selected knowledge workflow is highlighted with diagonal lines or coloring,
the workflow information display area includes a flow contents display area that displays contents of the selected knowledge workflow, and start button, and
in a case where the start button is depressed by the user, the update unit updates the selected knowledge workflow, and the execution unit executes the updated knowledge workflow.

7. The management system according to claim 1,
wherein the execution unit executes the knowledge workflow updated by the update unit on the one of the plurality of computers, the plurality of servers, the plurality of databases or the plurality of network equipment where the newly occurring incident has occurred, specified by the specific value.

8. The management system according to claim 1, wherein
the presentation unit presents, in response to selection by the user, a task contents display screen including an approval button.

9. The management system according to claim 1, wherein
the knowledge workflow comprises a number of times of use of the previous workflow.

10. The management system according to claim 1, wherein
the knowledge workflow holding unit is further configured to receive feedback from the user that the knowledge workflow has been useful, and
the knowledge workflow comprises a number of times the knowledge workflow holding unit receives the feedback that the knowledge workflow has been useful.

11. The management system according to claim 1, wherein
in a case where the input on the workflow definition registration screen is completed and the register button is depressed by the user,
the definition registration unit acquires, from the knowledge workflow holding unit, the knowledge workflow generated from the previous workflow for responding to the previous incident corresponding to the newly occurring incident.

12. The management system according to claim 1, wherein
the ticket reception unit is configured to generate a ticket issuance screen including, for the newly occurring incident, a system input area for receiving an input of a name or a system ID of the computer system in which the newly occurring incident occurs, a title input area for receiving an input of a title of the newly occurring incident, a text input area for receiving a text input, and a classification input area for receiving an input of a classification of the newly occurring incident.

13. A management system for management support of a computer system including a plurality of computers, a plurality of servers, a plurality of databases and a plurality of network equipment, comprising:
a memory; and
a processor executing a program stored in the memory, the program causing the management system to implement:
a knowledge workflow holding unit configured to hold information relating to an incident that has occurred previously in the computer system and a knowledge workflow generated from a previous workflow for responding to the incident in association with each other, the previous workflow including a command execution task and an approval task;
a ticket reception unit configured to acquire information relating to an incident newly occurring in the computer system from a user;
a definition registration unit configured to acquire, from the knowledge workflow holding unit, the knowledge workflow generated from the previous workflow for responding to the previous incident corresponding to the newly occurring incident on a basis of the information acquired by the ticket reception unit; and an update unit configured to update the knowledge workflow acquired by the definition registration unit on a basis of the information acquired by the ticket reception unit, wherein contents updated by the update unit in the knowledge workflow depends on a difference between the newly occurring incident and the previous incident corresponding to the newly occurring incident, the previous workflow has a part describing an operation and a target word corresponding to one of the plurality of computers, the plurality of servers, the plurality of databases or the plurality of network equipment, the knowledge workflow is generated from the previous workflow by replacing, by the definition registration unit, the target word with a variable to be operated while the part describing the operation remains unchanged, the information relating to the newly occurring incident acquired by the ticket reception unit includes a specific value specifying one of the plurality of computers, the plurality of servers, the plurality of databases or the plurality of network equipment where the newly occurring incident has occurred, the update unit replaces the targeted variable in the knowledge workflow with the specific value from the newly occurring incident specifying the one of the plurality of computers, the plurality of servers, the plurality of databases or the plurality of network equipment where the newly occurring incident has occurred, the management system further comprises a presentation unit configured to present the knowledge workflow acquired by the definition registration unit to the user in a selectable manner;

the management system further comprises an execution unit configured to execute the knowledge workflow updated by the update unit upon selection of the knowledge workflow acquired by the definition registration unit by the user, the definition registration unit increments the selected knowledge workflow and increments the version in the knowledge workflow holding unit, the presentation unit presents a workflow generation area that receives selections at desired positions by drag and drop from users to edit the workflow and place the command execution task and the approval task and edit branch settings, the definition registration unit comprises a screen that has a flow title input area, an incident information input area, a knowledge workflow information input area, and a register button, the incident information input area has an area for inputting various types of information regarding the previous incident, the knowledge workflow information input area has a component area, a workflow generation area, and a task-information specifying area, wherein a component to be used is arranged by the user from a plurality of components displayed in the component area at a desired position in the workflow generation area by drag and drop, and the workflow generation area is configured to specify a parameter of the task specified in the workflow generation area, in a case where the input on the workflow definition registration screen is completed and the register button is depressed by the user, and the definition registration unit acquires, from the knowledge workflow holding unit, the knowledge workflow generated from the previous workflow for responding to the previous incident corresponding to the newly occurring incident.

* * * * *